United States Patent [19]

Nakayama

[11] Patent Number: 5,265,020
[45] Date of Patent: Nov. 23, 1993

[54] TORQUE DISTRIBUTION CONTROL APPARATUS FOR FOUR WHEEL DRIVE

[75] Inventor: Yasunari Nakayama, Hiroshima, Japan

[73] Assignee: Mazda Motor Corporation, Hiroshima, Japan

[21] Appl. No.: 686,624

[22] Filed: Apr. 18, 1991

[30] Foreign Application Priority Data

Apr. 20, 1990 [JP] Japan .................. 2-105953

[51] Int. Cl.⁵ .............................. B62D 6/00
[52] U.S. Cl. .................. 364/424.05; 280/91; 180/197
[58] Field of Search ............ 364/424.05, 424.01, 364/424.1, 426.01, 426.03; 180/197; 280/91

[56] References Cited

U.S. PATENT DOCUMENTS

| | | | |
|---|---|---|---|
| 4,949,265 | 8/1990 | Eguchi et al. | 364/424.05 |
| 5,046,008 | 9/1991 | Dieter | 364/424.05 |
| 5,060,747 | 10/1991 | Eto | 180/197 |
| 5,088,043 | 2/1992 | Akishino et al. | 364/426.04 |
| 5,099,944 | 3/1992 | Kageyama et al. | 180/249 |

FOREIGN PATENT DOCUMENTS

1-247223 3/1988 Japan.

Primary Examiner—Thomas G. Black
Attorney, Agent, or Firm—Sixbey, Friedman, Leedom & Ferguson

[57] ABSTRACT

The torque distribution for four wheels is controlled correspondingly to the turning state of a car. In this case, a target yaw rate is determined on the basis of a steering angle and a car speed so that the torque distribution ratio of right and left wheels is set. Consequently, the turning of the car can be improved. In addition, a quantity of drivers' steering can be prevented from being excessively increased during turning.

17 Claims, 9 Drawing Sheets

TORQUE DISTRIBUTION CONTROL APPARATUS FOR FOUR WHEEL DRIVE

BACKGROUND OF THE INVENTION

The present invention relates to a torque distribution control apparatus for a four wheel drive.

In general, there has been known a torque distribution control apparatus for a four wheel drive which drives four wheels by engine outputs, wherein the torque distribution for each wheel is not always equivalent but is variably controlled so as to become optimum correspondingly to operating conditions.

For example, Japanese Unexamined Patent Publication No. 1-247223 has disclosed that the turning movement of a car is classified under three parts at the time of turning start, during turning and at the time of turning escape, so that the torque distribution is carried out correspondingly to the turning state of the car. In other words, the torque distribution on the rear wheel side is increased in order to enhance the small turn of the car. In addition, the torque distribution on the front wheel side is increased in order to enhance straightness at the time of turning escape.

On a low $\mu$ road of which friction coefficient (hereinafter referred to as $\mu$ if required) is small, a gain in momentum such as a lateral acceleration, a yaw rate and the like caused by drivers' steering is very smaller as compared with a high $\mu$ road. Accordingly, a quantity of drivers' steering is easily increased on the low $\mu$ road. In this case, steering wheels (front wheels) are driven with being excessively rolled. Consequently, the sufficient friction force cannot be obtained between the wheels and the road. Therefore, disadvantages are caused in running stability. In addition, it is hard for drivers to correct the change in movement of the car and steer the car.

On the other hand, there is proposed that a longitudinal torque distribution ratio is controlled such that the torque distribution for the front wheels is reduced and that for the rear wheels is increased. However, it is necessary to considerably increase the distribution ratio so as to obtain the required gain. In this case, the great burden is taken to the wheels (rear wheels) on which the larger driving torque is applied. Consequently, slip is easily caused so that the movement of the car changes sharply.

Furthermore, there is proposed that the torque distribution for right and left wheels is controlled correspondingly to a steering angle and a car speed. However, the low and high $\mu$ roads have different friction force, which is generated between the wheels and road, respectively. Consequently, it is hard to control the torque distribution uniformly.

SUMMARY OF THE INVENTION

It is an object of the present invention to provide a torque distribution control apparatus capable of relatively and easily making a gain of momentum on a low $\mu$ road, which is accompanied by drivers' steering, equal to or almost the same as the gain on a high $\mu$ road.

It is another object of the present invention to executing the torque distribution control in consideration of the actual state of a car such as the turning state or a load movement rate.

To achieve the above-mentioned objects, the present invention provides a torque distribution control apparatus which makes the car revolve and run easily by applying a driving force difference to right and left wheels so that autorotation moment of the car is utilized to control yaw (autorotation) movement.

The above-mentioned torque distribution control apparatus comprises torque distribution change means for adjusting a quantity of engine outputs to be transmitted to right and left front wheels and right and left rear wheels in order to change the torque distribution for the wheels, and torque distribution control means for controlling the torque distribution change means.

The torque distribution can be changed by controlling braking devices provided on the wheels so as to adjust the quantity of the engine outputs to be transmitted.

The torque distribution control means includes a yaw rate setting section for setting target yaw rate on the basis of a steering angle detected by a steering angle sensor and a car speed detected by a car speed sensor, and a lateral distribution ratio setting section for setting the torque distribution ratio between the right and left wheels (hereinafter referred to as a lateral distribution ratio if necessary) so as to obtain the target yaw rate on the basis of an actual yaw rate detected by a yaw rate sensor and the target yaw rate set by the yaw rate setting section, wherein the torque distribution change means is controlled on the basis of the distribution ratio thus set.

In this case, the torque distribution control means includes a running state decision section for deciding on the basis of the steering angle whether the car is in the state of turning start or turning escape. It is desired that the yaw rate is set on the basis of the target yaw rate which is caused at the time of running on the high $\mu$ road. The yaw rate setting section can set the target yaw rate to be increased at the time of turning start and decreased at the time of turning escape.

The torque distribution control means may include a lateral distribution ratio correction section for restricting and correcting the lateral distribution ratio on the basis of the load movement rate between the right and left wheels of the car.

In addition, the torque distribution control means may include a longitudinal distribution ratio setting section and a longitudinal distribution ratio correction section. The longitudinal distribution ratio setting section sets the torque distribution ratio for the front and rear wheels (hereinafter referred to as a longitudinal distribution ratio if necessary) correspondingly to the operating conditions of the car. The longitudinal distribution ratio correction section corrects the longitudinal distribution ratio so as to reduce the torque distribution for the rear wheels when the actual yaw rate exceeds the target yaw rate.

Referring to the torque distribution control apparatus, the driving force difference is applied between the right and left wheels by the torque distribution change means. Consequently, the autorotation moment which is caused on the car is utilized to control the yaw movement against steering. As a result, a slide angle is applied to the rear wheels so that the turning movement of the car can easily be carried out.

The lateral distribution ratio is determined on the basis of the actual and target yaw rates such that the target yaw rate set by the steering angle and car speed can be obtained. Since the actual yaw rate itself is great on the high $\mu$ road which causes the great friction force along with the wheels, the lateral distribution ratio is decreased in order to obtain the target yaw rate. On the other hand, the lateral distribution ratio is increased on the low $\mu$ road. In other words, the lateral distribution ratio is automatically changed correspondingly to the height of $\mu$ of the road. Consequently, it is possible to give the car the yaw movement corresponding to the steering angle and car speed irrespective of the height of $\mu$ of the road, i.e., at drivers' request.

In this case, if the target yaw rate is set so as to be increased at the time of revolution running start and decreased during turning and at the time of turning escape, the lateral distribution ratio is made greater for the same steering angle or car speed at the time of turning start. Consequently, the small turn of the car can be enhanced. At the time of turning escape, the lateral distribution ratio is made smaller. As a result, the slide angle of the rear wheels is not increased excessively. Accordingly, the grip force of the rear wheels can be prevented from being reduced against the road. Therefore, the straight running can be attained.

In the case where the lateral distribution ratio is restricted and corrected on the basis of the road movement rate between the right and left wheels, the stability of turning can be enhanced.

More specifically, when $\mu$ is decreased, the lateral distribution ratio is increased. In this case, when the lateral distribution ratio exceeds the driving force difference corresponding to the load movement of the right and left wheels, the slip rate of turning outer wheels (outer wheels at turning), of which driving force is made greater, is increased. If the lateral distribution ratio is restricted according to the load movement rate, the increase in slip rate can be prevented. In this case, the occurrence of the lateral acceleration is delayed at the time of turning start. Consequently, the small turn of the car cannot greatly be enhanced. Accordingly, it is desired that the lateral distribution ratio is not restricted and corrected according to the load movement rate.

When the actual yaw rate exceeds the target yaw rate, the longitudinal distribution for ratio is corrected such that the torque distribution for the rear wheels is decreased, so that the yaw movement can be decreased.

More specifically, if the lateral distribution ratio is set so as to obtain the target yaw rate, the actual yaw rate increase is delayed for the steering on the low $\mu$ road. Consequently, there is a possibility that the actual yaw rate exceeds the target yaw rate. In that case, if only the driving force difference of the right and left wheels tries to prevent the possibility, the slip rate of turning inner rear wheel (inner rear wheel at turning) is increased. On the other hand, if the longitudinal distribution ratio is corrected, the grip force of the rear wheels can be increased to decrease the yaw movement.

According to the present invention, the torque distribution ratio between the right and left wheels is set so as to obtain the target yaw rate on the basis of the actual yaw rate and target yaw rate. In addition, the torque distribution change means is controlled. Also on the low $\mu$ road, the car can therefore receive a movement quantity which is equal to or almost the same as the movement quantity on the high $\mu$ road. Furthermore, the quantity of drivers' steering can be prevented from being increased on the low $\mu$ road. Consequently, the running stability and turning operation of the car can be improved.

Furthermore, if the running state decision section is provided such that the yaw rate setting means sets the target yaw rate to be increased at the time of turning start and decreased at the time of turning escape, the small turn of the car can be enhanced at the time of turning start without damaging the grip force of the rear wheels at the time of turning escape.

If the lateral distribution ratio correction section is provided such that the lateral distribution ratio is restricted and corrected on the basis of the load movement rate between the right and left wheels, the slip rate of the turning outer wheels can be prevented from being increased. Consequently, the stability of the turning can be improved.

If there are provided the longitudinal distribution ratio setting section and the longitudinal distribution ratio correction section for correcting the longitudinal distribution ratio such that the torque distribution for the rear wheels is decreased when the actual yaw rate exceeds the target yaw rate, the slip rate of the turning inner rear wheels can be prevented from being increased even though the yaw movement exceeds a target value. Consequently, the movement of the car can be stabilized.

These and other objects, features and advantages of the present invention will become more apparent upon a reading of the following detailed description and drawings.

BRIEF DESCRIPTION OF THE DRAWINGS

FIGS. 2 to 16 show an embodiment of the present invention;

DETAILED DESCRIPTION OF A PREFERRED EMBODIMENT

A preferred embodiment of the present invention will be described with reference to the drawings.

Explanation of an Entire Structure

Figure 1:
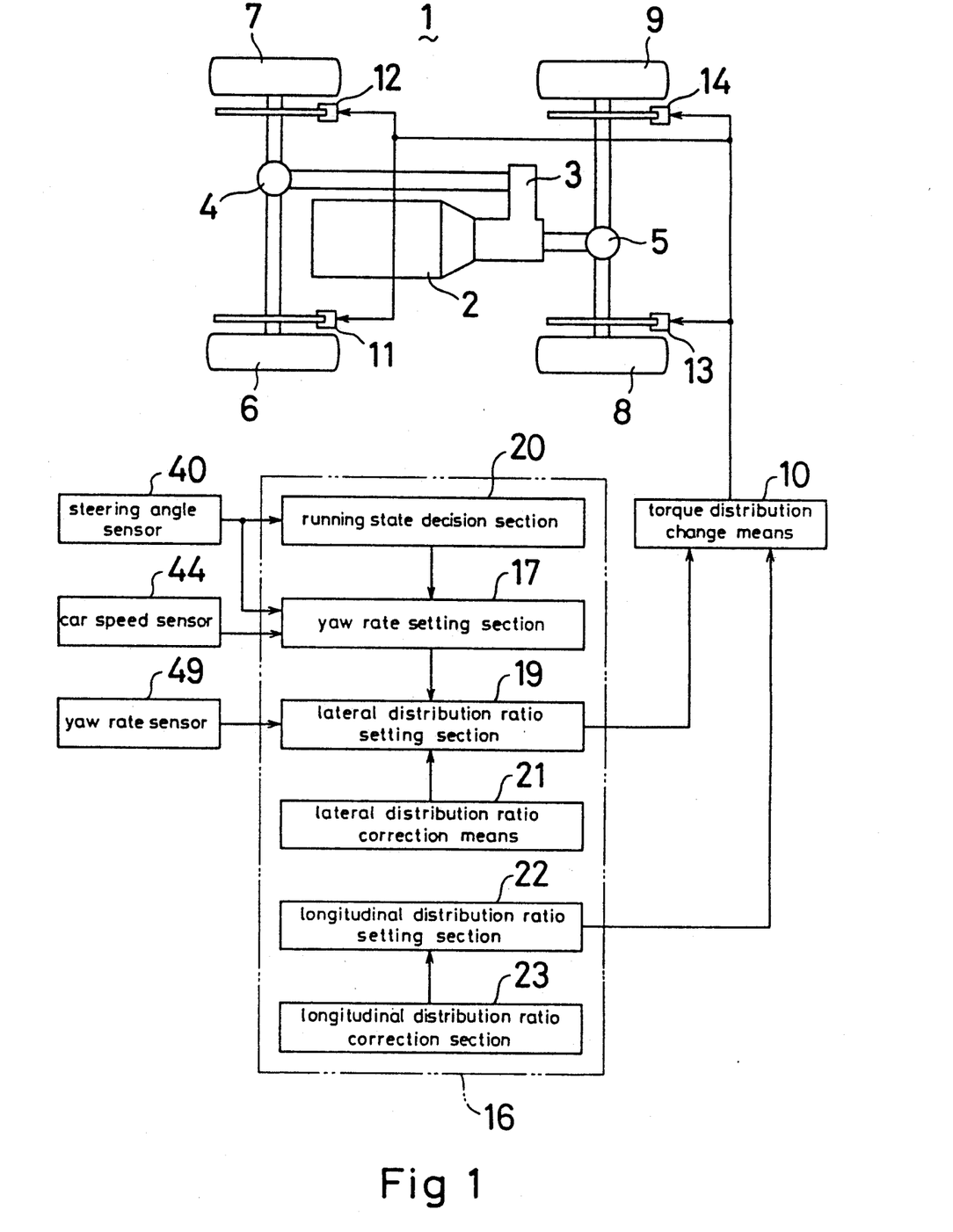
FIG. 1 is a view showing an entire structure according to the present invention.
Figure 2:
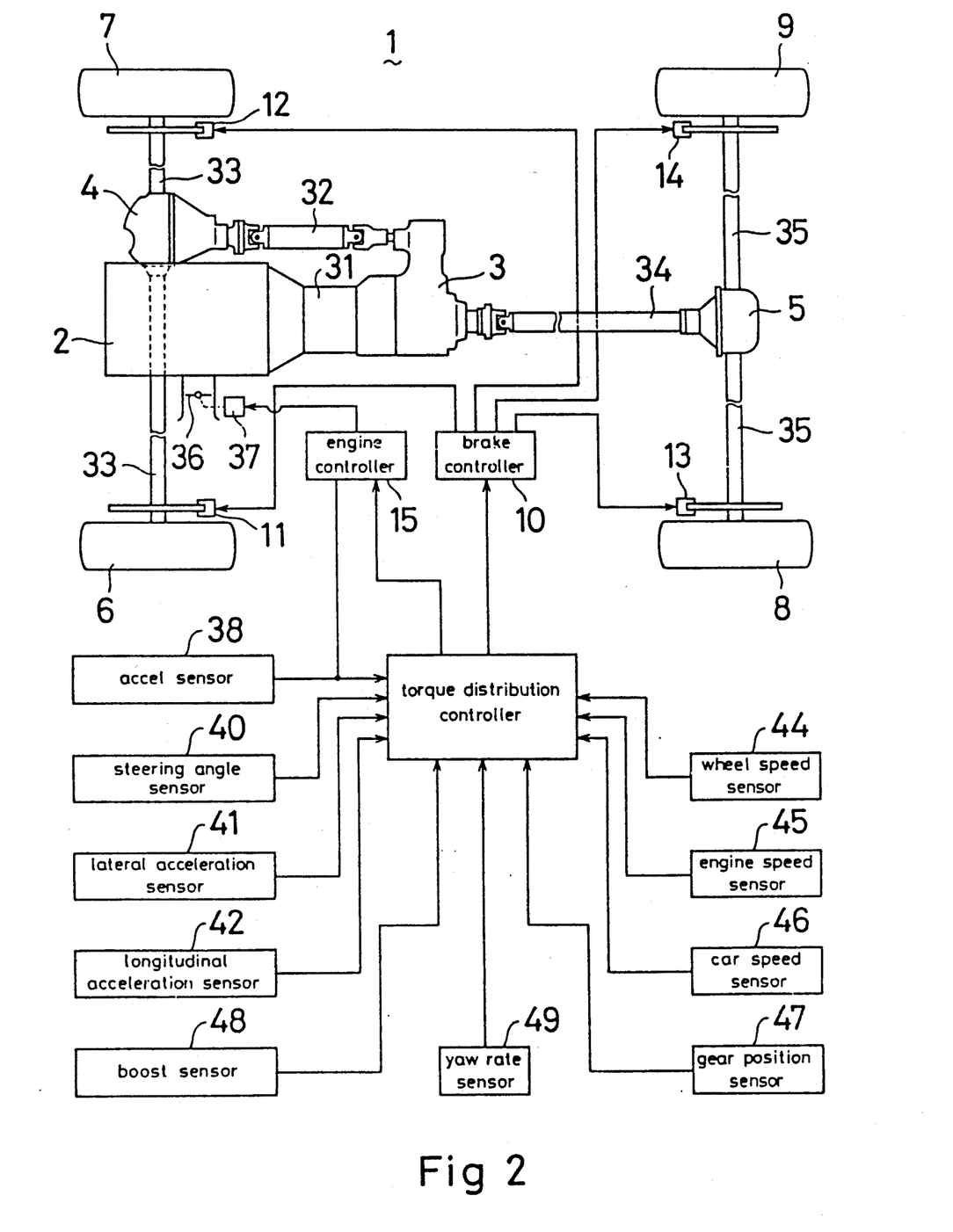
FIG. 2 is a view showing an entire structure.

As shown in FIGS. 1 and 2, an output of an engine 2 is inputted to a transfer 3 through a transmission 31. The transfer 3 has a center differential for equally transmitting an engine output to front and rear wheel sides. A front differential 4 is connected to an output shaft 32 on the front wheel side of the transfer 3. Right and left front wheels 6 and 7 are connected to the front differential 4 through a front wheel driving shaft 33. Similarly, a rear differential 5 is connected to an output shaft 34 on the rear wheel side of the transfer 3. Right and left rear wheels 8 and 9 are connected to the rear differential 5 through a rear wheel driving shaft 35.

A brake controller 10 as torque distribution change means includes a braking pressure control valve and an actuator. The braking pressure control valve separately controls the braking pressure to be supplied to braking devices 11 to 14 provided on the wheels 6 to 9. A o23 throttle valve 36 of the engine 2 has its opening adjusted by a throttle motor 37.

An engine controller as engine output change means is indicated at 15. The engine controller 15 receives an accel signal from an accel sensor 38 which detects a quantity of accel operated by drivers, and then outputs an operation control signal to the throttle motor 37 so as to adjust the opening of the throttle valve 36 correspondingly to the quantity of accel operated by the drivers. In addition, the engine controller 15 receives a control signal from a torque distribution controller 16 as torque distribution control means and changes the engine output in order to obtain the engine output torque required to change the torque distribution.

The torque distribution controller 16 receives signals from the accel sensor 38, and various signals for measuring an operation quantity or a movement quantity for controlling the torque distribution for the wheels 6 to 9. Then, the torque distribution controller 16 outputs a control signal to the brake controller 10 and the engine controller 15. Output sources for the various signals are as follows;

a steering angle sensor 40 for detecting a steering angle of a wheel, a lateral acceleration sensor 41 for detecting a lateral acceleration of a car, a longitudinal acceleration sensor 42 for detecting a longitudinal acceleration of the car, a wheel speed sensor 44 for detecting an engine speed of the wheels 6 to 9, an engine speed sensor 45 for detecting the engine speed, a car speed sensor 46, a gear position sensor 47 for detecting a gear position (gear speed) of a transmission 25, a boost sensor 48 for detecting a boost of the engine 2, and a yaw rate sensor 49 for detecting a yaw rate of the car.

The torque distribution controller 16 includes a load movement correspondence control section and a turning state correspondence control section. The load movement correspondence control section sets the longitudinal and lateral distribution ratios correspondingly to the load movement of the car. The turning state correspondence control section sets the longitudinal and lateral distribution ratios correspondingly to the turning state of the car.

The turning state correspondence control section has a yaw rate setting section for setting a target yaw rate on the basis of the steering angle and car speed, a lateral distribution ratio setting section for setting the lateral distribution ratio on the basis of the target yaw rate and the actual yaw rate so as to obtain the target yaw rate, a longitudinal distribution ratio setting section, a lateral distribution ratio correction section for restricting and correcting the lateral distribution ratio on the basis of the load movement rate of the right and left wheels, and a longitudinal distribution ratio correction section for correcting the longitudinal distribution ratio when the actual yaw rate exceeds the target yaw rate.

Explanation of the Brake Controller 10

Figure 3:
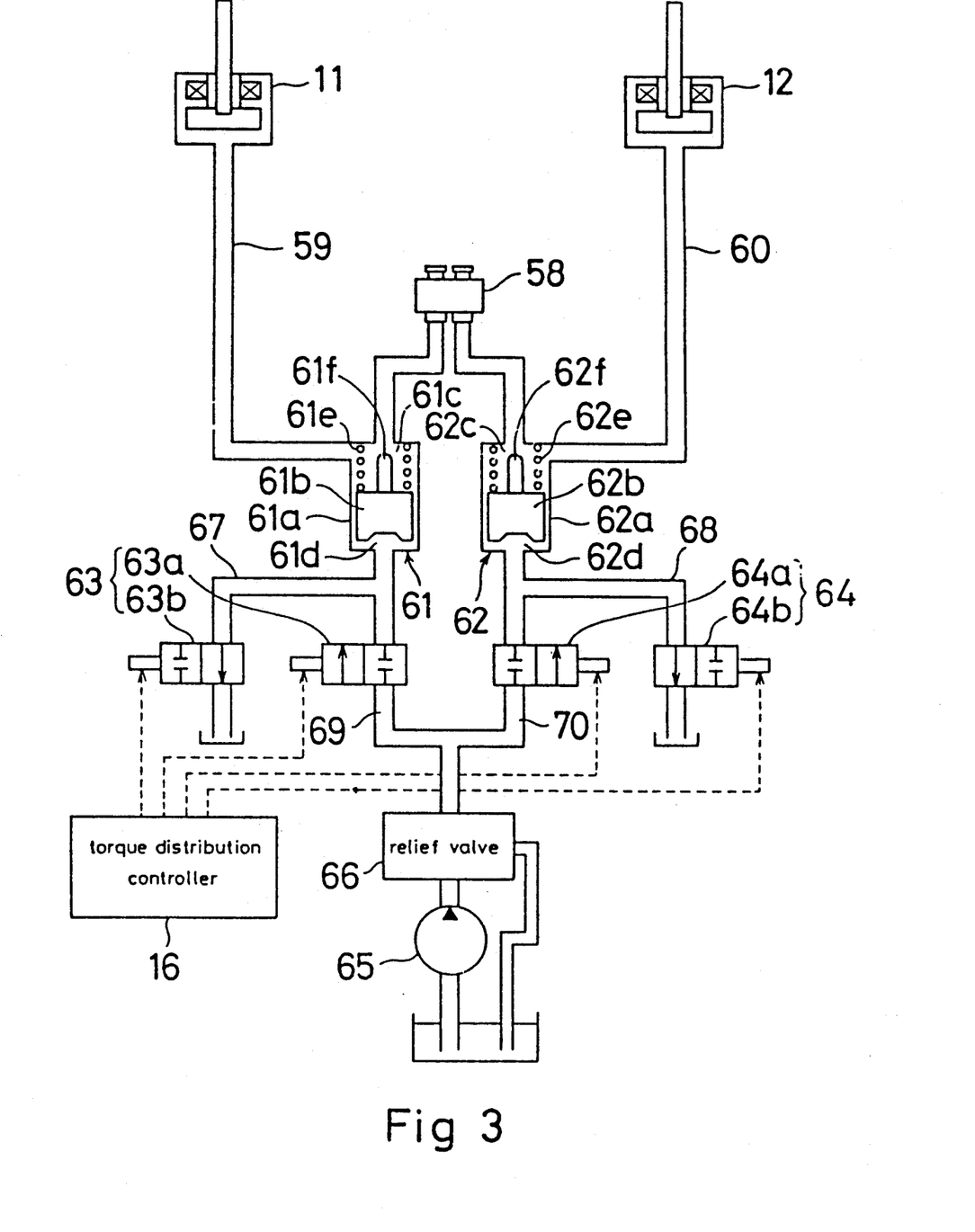
FIG. 3 is a circuit diagram showing torque distribution change means.

In FIG. 3, at 59 is indicated a first hydraulic line for the braking device 11 of the left front wheel 6, and at 60 is indicated a second hydraulic line for the braking device 12 of the right front wheel 7. The first and second hydraulic lines 59 and 60 have first and second braking pressure control valves 61 and 62 provided therebetween. The first and second braking pressure control valves 61 and 62 control the supply of the braking pressure. In addition, the first and second braking pressure control valves 61 and 62 have cylinders 61a and 62a partitioned into variable volume chambers 61c and 62c, and control chambers 61d and 62d by pistons 61b and 62b. The variable volume chambers 61c and 62c supply the braking pressure generated by a master cylinder 58 to the braking devices 11 and 12.

The pistons 61b and 62b are energized such that the volume of the variable volume chambers 61c and 62c is increased by springs 61e and 62e, and move such that the variable volume chambers 61c and 62c are reduced against the springs 61e and 62e by the control pressure introduced into the control chambers 61d and 62d. Furthermore, the pistons 61b and 62b have check valves 61f and 62f for closing braking pressure inlets of the variable volume chambers 61c and 62c according to the movement mentioned above. Accordingly, the control pressure is introduced into the control chambers 61d and 62d so that the pistons 61b and 62b move against the springs 61e and 62e. Consequently, there is blocked the space between the master cylinder 58 and the variable volume chambers 61c and 62c. In addition, the braking pressure in the variable volume chambers 61c and 62c is supplied to the braking devices 11 and 12.

There are provided first and second actuators 63 and 64 having pressure increasing electromagnetic valves 63a and 64a and pressure reducing electromagnetic valves 63b and 64b to operate the braking pressure control valves 61 and 62. The pressure increasing electromagnetic valves 63a and 64a are provided on control pressure supply lines 69 and 70. The control pressure supply lines 69 and 70 are lead to the control chambers 61d and 62d of the braking pressure control valves 61 and 62 through an oil pump 65 and a relief valve 66. The pressure reducing electromagnetic valves 63b and 64b are provided on drain lines 67 and 68 which are lead from the control chambers 61d and 62d. The electromagnetic valves 63a, 63b, 64a and 64b are opened or closed by the signals from the torque distribution controller 16. When the pressure increasing electromagnetic valves 63a and 64a are opened and the pressure reducing electromagnetic valves 63b and 64b are closed, the control pressure is introduced into the control chambers 61d and 62d of the braking pressure control valves 61 and 62. When the pressure increasing electromagnetic valves 63a and 64a are closed and the pressure reducing electromagnetic valves 63b and 64b are opened, the control pressure is discharged from the control chambers 61d and 62d.

The braking devices 13 and 14 of the right and left rear wheels 8 and 9, which are not shown, have the same structures as those of the braking devices 11 and 12 of the front wheels 6 and 7. With the above-mentioned structures, the independent braking pressure can be applied to the braking devices 11 to 14.

There will be described the torque distribution controller 16.

Entire Flow of Processing

Figure 4:
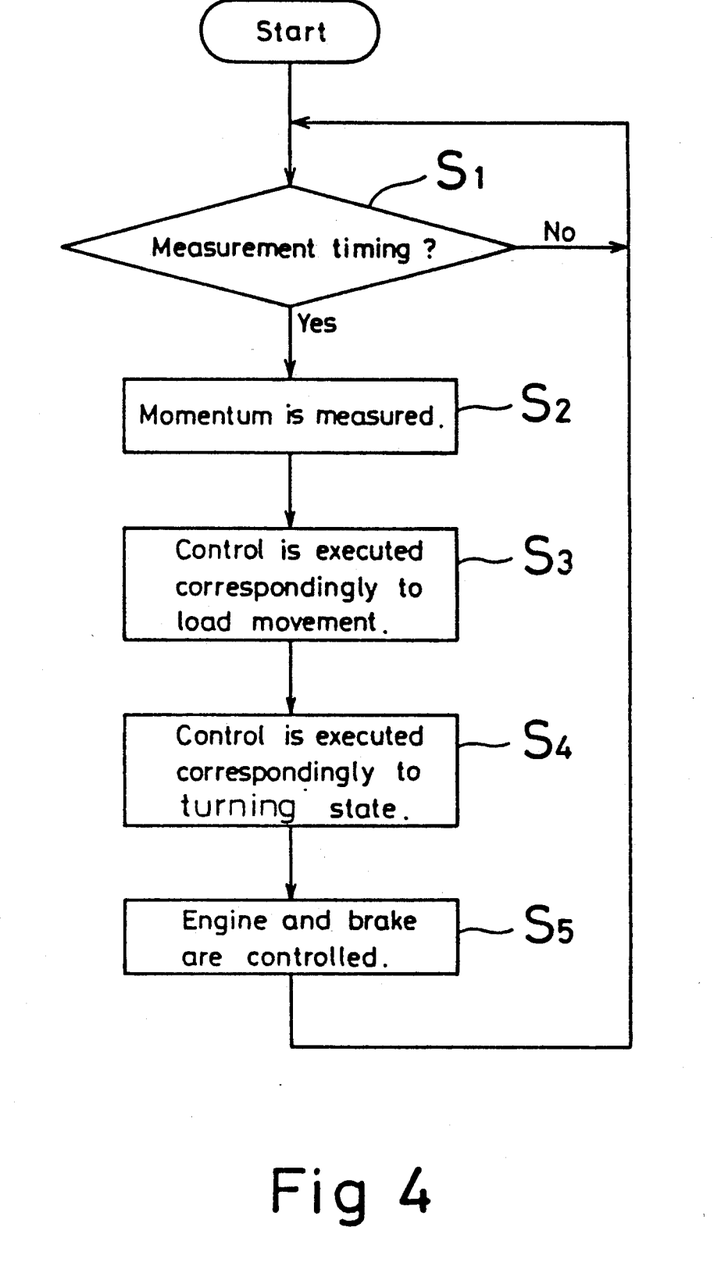
FIG. 4 is a flow chart showing the entire torque distribution control.

FIG. 4 shows the entire flow of processing. When a predetermined measurement timing is obtained after starting, the accel opening, steering angle, lateral acceleration, longitudinal acceleration, wheel speed, engine speed, car speed, gear position, boost, actual yaw rate of the car are measured by the signals from the sensors 38, 40 to 42, and 44 to 49 shown in FIG. 2 (Steps S1 and S2). Then, a longitudinal distribution ratio Q1 and a lateral distribution ratio Q2 are set correspondingly to the load movement by the load movement correspondence control section. A longitudinal distribution ratio R1 and a lateral distribution ratio R2 are set correspondingly to the turning state by the turning state correspondence control section. A longitudinal distribution ratio K1 and a lateral distribution ratio K2 are set on the basis of Q1, Q2, R1 and R2. Consequently, the control is executed by the brake controller 10 and the engine controller 15 (Steps S3 to S5).

According to the present embodiment, the longitudinal distribution ratio K1 and the like are set such that the longitudinal distribution is uniform at 0, the driving torque of the front wheels 6 and 7 is 0 (and that of the rear wheels 8 and 9 is the maximum) at +0.5, and the driving torque of the rear wheels 8 and 9 is 0 (and that of the front wheels 6 and 7 is the maximum) at −0.5. The lateral distribution ratio K2 and the like are set such that the lateral distribution is uniform at 0, the driving torque of the left wheels 6 and 8 is 0 (and that of the right wheels 7 and 9 is the maximum) at +0.5, and the driving torque of the right wheels 7 and 9 is 0 (and that of the left wheels 6 and 8 is the maximum) at −0.5.

Load Movement Correspondence Control

Figure 5:
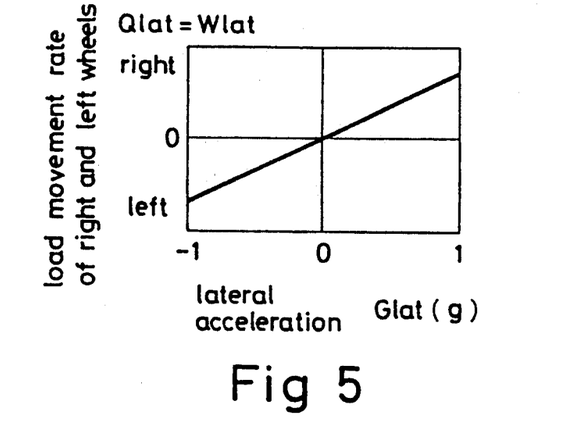
FIG. 5 is a characteristic chart showing the relationship between a lateral acceleration and a load movement rate.
Figure 6:
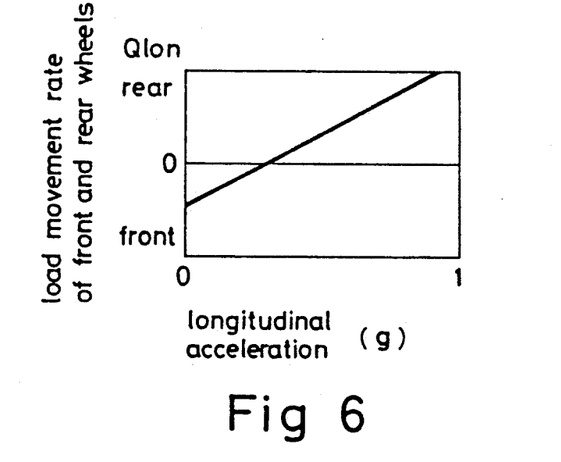
FIG. 6 is a characteristic chart showing the relationship between a longitudinal acceleration and the load movement rate.

On the basis of maps shown in FIGS. 5 and 6, a load movement rate Q1at between the left wheels 6 and 8 and the right wheels 7 and 9 is obtained depending on a lateral acceleration G1at, and a load movement rate Q1on between the front wheels 6 and 7 and the rear wheels 8 and 9 is obtained depending on a longitudinal acceleration.

Figure 7:
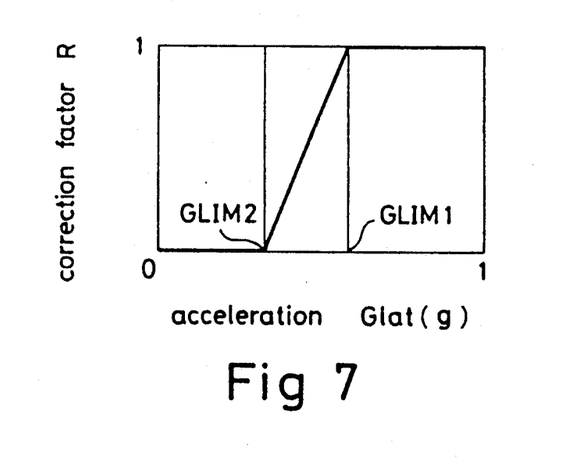
FIG. 7 is a characteristic chart showing the relationship between an acceleration and a torque distribution ratio correction factor.

A torque distribution ratio correction factor R is obtained on the basis of the above-mentioned accelerations with reference to a map shown in FIG. 7. The longitudinal wheel load movement rate Q1on and lateral wheel load movement rate Q1at are respectively multiplied by the correction factor R so as to obtain the longitudinal torque distribution ratio Q1 and lateral torque distribution ratio Q2 corresponding to the load movement.

$$Q1 = Q1on \times R$$

$$Q2 = Q1at \times R$$

In the region in which the longitudinal acceleration and lateral acceleration are low, the correction factor R corrects the torque distribution ratios Q1 and Q2 to be decreased when the acceleration is decreased. In FIG. 7, GLIM1 and GLIM2 are upper and lower limit values of the acceleration in which the correction factor R corrects the torque distribution ratios Q1 and Q2. If the acceleration is greater than GLIM1, the load movement rates Q1on and Q1at are the torque distribution ratios Q1 and Q2 (R=1). If the acceleration is smaller than GLIM2, R is equal to 0, i.e., the torque distribution ratios Q1 and Q2 are equal to 0.

Turning State Correspondence Control

Basically, the longitudinal distribution ratio R1 is determined on the basis of the lateral slide angle of the rear wheels 8 and 9. Then, the lateral distribution ratio R2 is determined so as to obtain the target yaw rate. In addition, the distribution ratios R1 and R2 are corrected correspondingly to the turning state of the car.

Figures 8, 9:
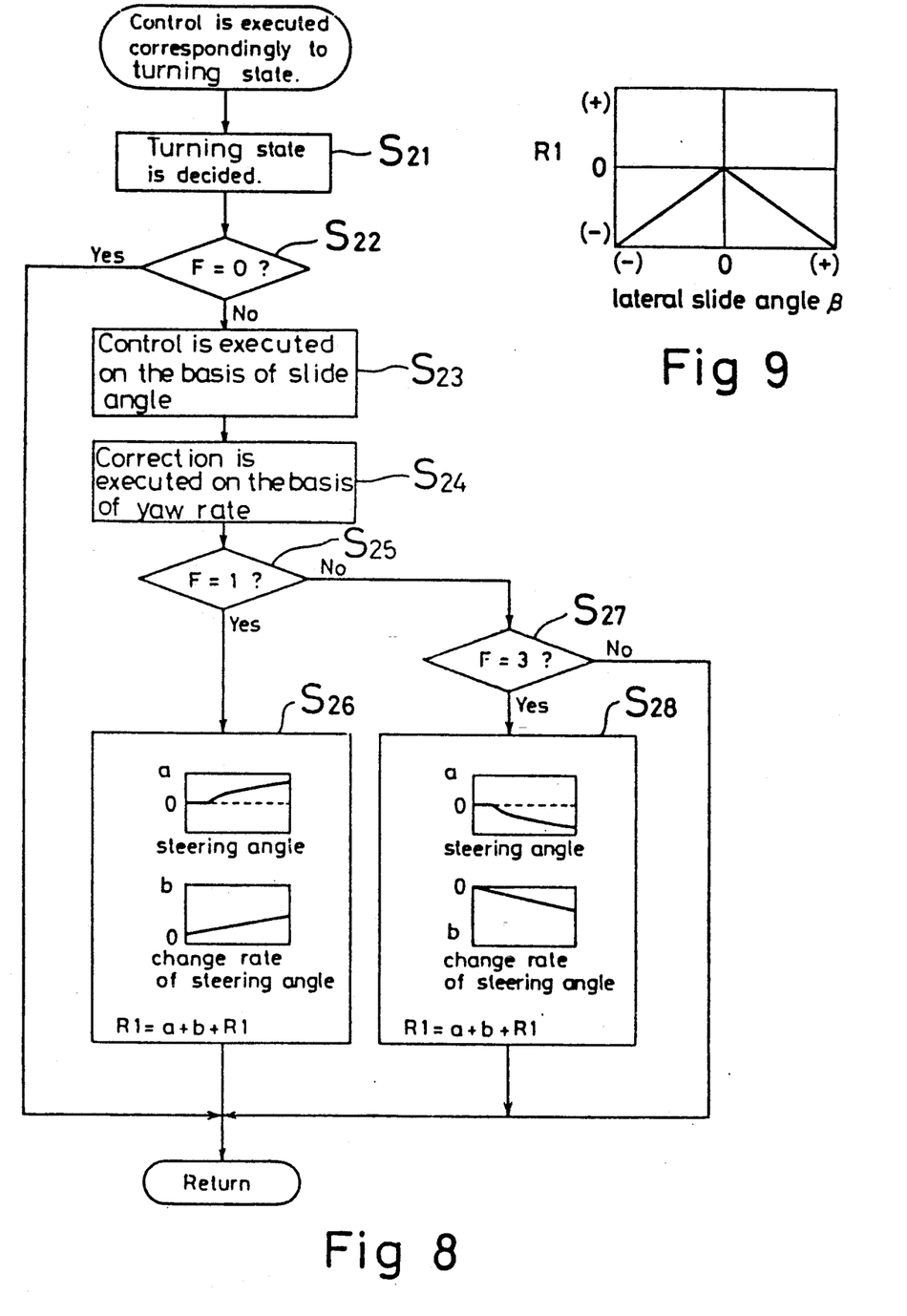
FIG. 8 is a flow chart of turning state correspondence control.
FIG. 9 is a characteristic chart showing the relationship between a lateral slide angle and a longitudinal distribution ratio.

More specifically, the control is executed according to a flow shown in FIG. 8. First, it is decided whether the car is in the turning state (Step S21). If the car is in the turning state (Step S22), the longitudinal distribution ratio R1 is determined depending on the slide angle and the lateral distribution ratio R2 is determined depending on the yaw rate (Steps S23 and S24). If the car is in the state of turning start and turning escape, the longitudinal distribution ratio R1 is corrected and controlled on the basis of the steering angle and change rate thereof (Steps S25 to S28).

Decision of the Revolution State (Step S21)

It is decided whether the car is in the turning state depending on the steering angle and the change rate thereof obtained by the steering angle sensor 40. Consequently, a turning state decision flag F can be obtained. In this case, the flag F means the following.

F=0 ... straight running;
The steering angle is smaller than a predetermined value.

F=1 ... turning start;
The change rate of steering angle is equal to or greater than a predetermined value in a plus direction (in which the steering angle is increased).

F=2 ... constant turning (at nearly constant turning diameter); The steering angle is equal to or greater than the predetermined value, and the change rate of steering angle is smaller than the predetermined value.

F=3 ... turning escape; The change rate of steering angle is equal to or greater than the predetermined value in a minus direction (in which the steering angle is decreased).

Accordingly, the decision in Step S2 means that the straight running state (F=0) is removed from a control object.

Slide Angle Control (Step S23)

The longitudinal distribution ratio R1 is set depending on the slide angle by means of the steering angle sensor 40, car speed sensor 46 and yaw rate sensor 49. In other words, there is obtained a lateral slide angle $\beta$ of the rear wheels 8 and 9 owing to the yaw movement of the car by the following formula. With reference to a characteristic map shown in FIG. 9, the longitudinal distribution ratio R1 is set.

$$\beta = Yaw.r1r/V$$

Yaw.r; actual yaw rate
1r; distance from the center of gravity to the rear wheels of the car
V; car speed In this case, when the lateral slide angle $\beta$ is equal to 0, the longitudinal distribution ratio R1 is equal to 0. If the lateral slide angle $\beta$ is increased in plus and minus directions, the longitudinal distribution ratio R1 is increased in the minus direction. Referring to the yaw rate Yaw.r, the right revolution is set in the plus direction. Accordingly, $\beta$ having a plus or minus sign corresponds to the right or left revolution of the car.

Yaw Rate Correction (Step S24)

Figures 10, 11, 12:
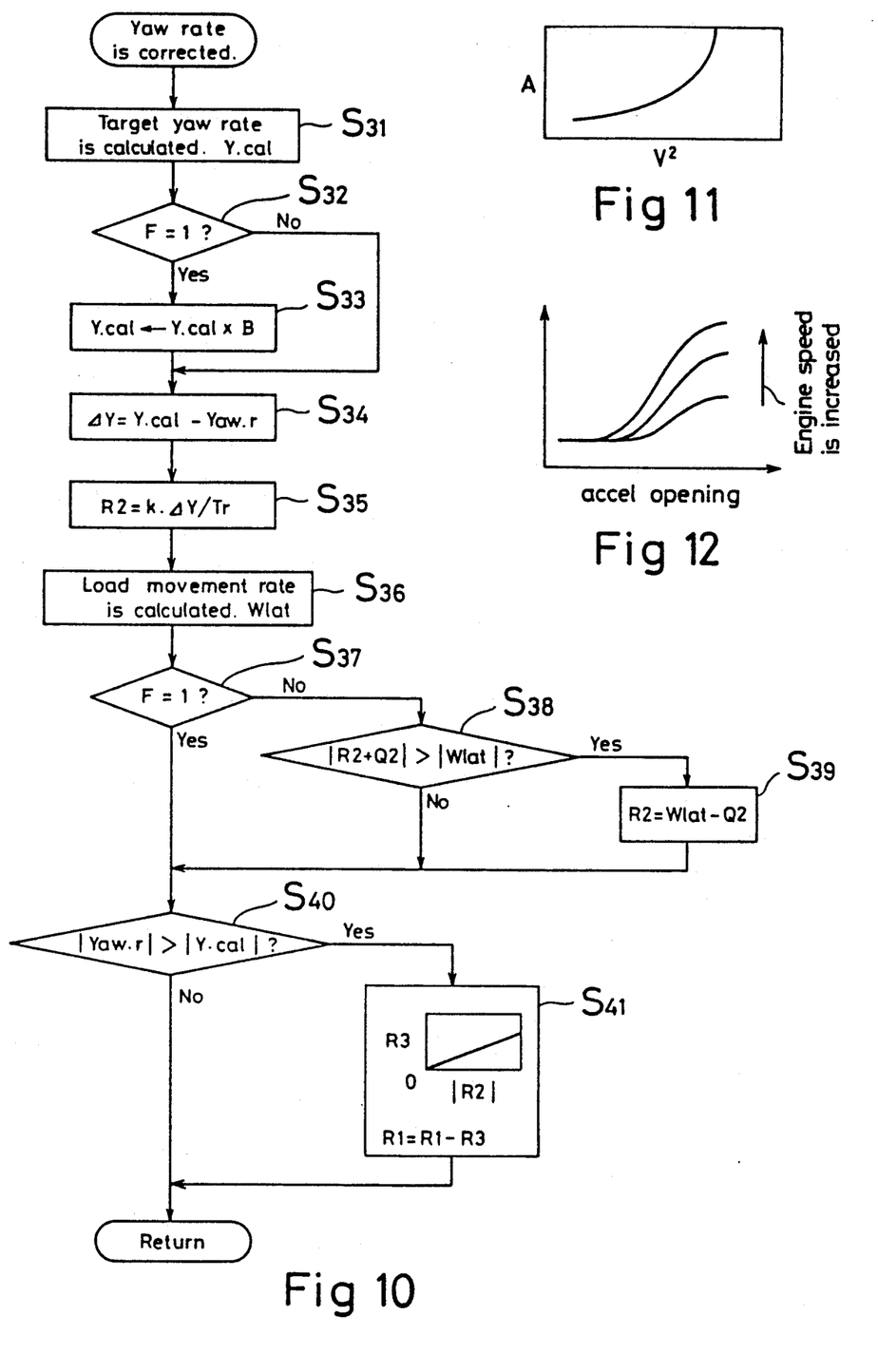
FIG. 10 is flow chart of yaw rate correction control.
FIG. 11 is a characteristic chart showing the relationship between a wheel speed and a factor A.
FIG. 12 is a characteristic chart showing the relationship between output torque and accelerator pedal position.

The yaw rate correction is executed by the yaw rate setting section, lateral distribution ratio setting section, lateral distribution ratio correction section and longitudinal distribution ratio correction section according to a flow shown in FIG. 10.

Target Yaw Rate Calculation (Step S31)

A target yaw rate Y.cal is calculated and set on the basis of the lowest wheel speed v of four wheel speeds obtained by the wheel speed sensor 44, the steering angle $\theta$ and a wheel base 1.

$$V.cal = v/(1+Av)\theta/1$$

A is a factor for obtaining the movement characteristics of the car on the high $\mu$ road. The factor A can be obtained by a characteristic map shown in FIG. 11.

At the time of turning start (F=1), the target yaw rate Y.cal is multiplied by a correction factor B (B=1) so as to increase and correct the yaw rate Y.cal (Steps S32 and S33). The target yaw rate Y.cal, which is calculated and set in Step S31, is suitable for the control during turning (F=2) and at the time of turning escape (F=3). At Step 33, the target yaw rate Y.cal is changed into a value which is suitable for the control at the time of turning start (F=1). In the case where the target yaw rate Y.cal is calculated and set to a large value which is suitable for the control at the time of turning start (F=1) in Step S31, the target yaw rate Y.cal is multiplied by the correction factor B (B<1) so as to be decreased and corrected when F is not equal to 1.

Lateral Distribution Ratio Setting (Steps S34 and S35)

In the case where the lateral distribution ratio R2 is to be set depending on the yaw rate, feed-back control is executed such that the target yaw rate Y.cal is obtained from a deviation $\Delta Y$ of the target yaw rate Y.cal from the actual yaw rate Yaw.r obtained by yaw rate detection means 49.

More specifically, $\Delta Y = Y.cal - Yaw.r$ is found to obtain a driving torque difference of the right and left wheels corresponding to the deviation $\Delta Y$. The ratio of the driving torque difference to the drivers' request torque is found by the following formula, so that the lateral distribution ratio R2 is obtained.

$$R2 = k\Delta Y/Tr$$

where k is a constant for obtaining the driving torque difference of the right and left wheels corresponding to the deviation $\Delta Y$, and Tr is the drivers' request torque. Tr can be obtained as follows. First, the accel opening (accelerator pedal position) and an engine speed (RPM) are detected by the accel sensor 38 and the engine speed sensor 45. Then, the driving torque of the engine is calculated on the basis of the accel opening and the engine speed (RPM) with reference to a map shown in FIG. 12. The driving torque thus obtained is multiplied by a gear ratio detected by the gear position sensor 47. Consequently, Tr can be obtained.

Lateral Distribution Ratio Correction (Steps S36 to S39)

First, a load movement rate W1at of the right and left wheels is obtained (Step S36). In other words, the load movement rate W1at is obtained on the basis of a lateral acceleration G1at obtained by the lateral acceleration sensor 41 with reference to a map shown in FIG. 5. Except for the turning start (F=1) (Step S37), i.e., during turning and at the time of turning escape, an absolute value of the load movement rate W1at is compared with an absolute value obtained by adding the lateral distribution ratios Q2 and R2. If 3 R2+Q2 3>3 W1at 3, R2 is restricted according to the following formula (Steps S38 and S39).

$$R2 = W1at - Q2$$

Longitudinal Distribution Ratio Correction (Steps S40 and S41)

An absolute value of the actual yaw rate Yaw.r is compared with that of the target yaw rate Y.cal. If 3 Yaw.r 3>3 Y.cal 3, the longitudinal distribution ratio R1 is corrected so as to be decreased (such that the torque distribution for the rear wheels 8 and 9 is decreased) when the absolute value of R2 is increased.

R1 Correction on the Basis of the Steering Angle and change rate Thereof (Steps S25 to S28)

As seen from the characteristic chart for correction factors a and b and the formula for R1 (R1=a+b+R1) in Step S26, R1 is corrected so as to be increased when the steering angle and change rate thereof are increased at the time of turning start (F=1).

As seen from the characteristic chart for the correction factors a and b and the formula for R1 (R1=a+b+R1) in Step S28, R1 is corrected so as to be decreased when the steering angle and change rate thereof are increased at the time of turing escape (F=3).

Engine and Brake Control

By the following formula is calculated torque Ts which is required to execute torque distribution control depending on to the longitudinal distribution ratio K1=Q1+R1 and the lateral distribution ratio K2=Q2+R2.

$$Ts = 4 \times (3K13+0.5) \times (3K23+0.5) \times Tr$$

The engine controller 15 is controlled in order to obtain the required torque Ts. By the following formulas are calculated the braking torque TBFR (right front wheel), TBFL (left front wheel), TBRR (right rear wheel) and TBRL (left rear wheel) to be applied to the wheels 6 to 9 on the basis of the distribution ratios K1 and K2. The brake controller 10 is controlled in order to obtain the braking torque mentioned above.

$$TBFR = Ts - 4(0.5 - K1) \times (0.5 + K2) \times Ts$$

$$TBFL = Ts - 4(0.5 - K1) \times (0.5 - K2) \times Ts$$

$$TBRR = Ts - 4(0.5 + K1) \times (0.5 + K2) \times Ts$$

$$TBRL = Teng - 4(0.5 + K1) \times (0.5 - K2) \times Ts$$

According to the revolution state correspondence control, the longitudinal distribution ratio R1 is set such that the torque distribution for the rear wheels 8 and 9 is decreased when the lateral slide angle is increased. Consequently, if the lateral slip of the rear wheels 8 and 9 is increased during turning so that spin tendency is caused, the driving force of the rear wheels 8 and 9 is decreased without waiting for the decrease in quantity of drivers' steering. As a result, the lateral slip of the rear wheels 8 and 9 can be prevented so that the turning can be stabilized on the low μ road. R1 is corrected so as to be increased at the time of turning start depending on the steering angle and change rate thereof. Consequently, the small turn of the car can be enhanced. In addition, R1 is corrected so as to be decreased at the time of turning escape. Therefore, the grip force of the rear wheels can be enhanced so as to stabilize the running.

The lateral distribution ratio R2 is set by feed-back control in order to obtain the target yaw rate having the characteristics on the high μ road. Consequently, the great yaw rate can be obtained on the low μ road so as to enhance the turning steering.

Figure 13:
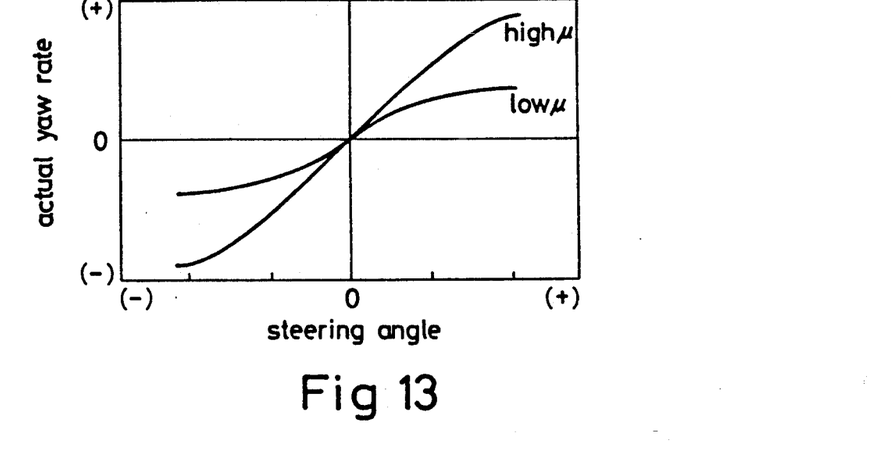
FIG. 13 is a characteristic chart showing the relationship between a steering angle and a yaw rate on high and low $\mu$ roads.
Figure 14:
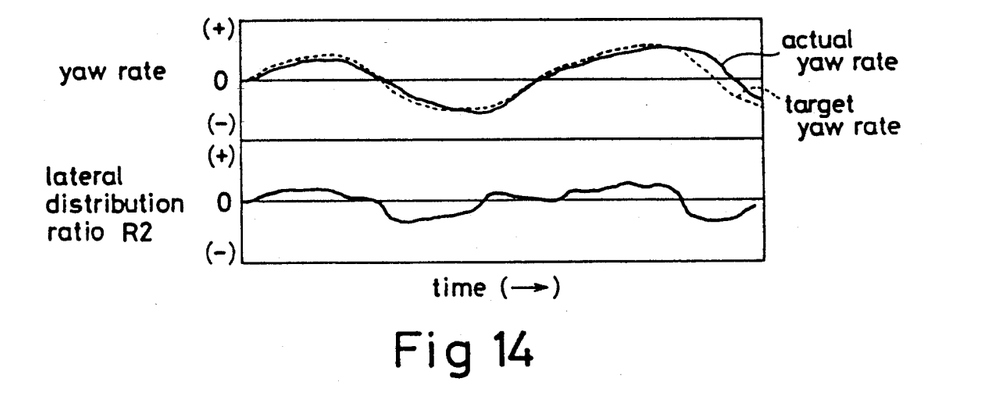
FIG. 14 is a characteristic chart showing a change with the passage of time of the yaw rate and lateral distribution ratio.
Figure 16:
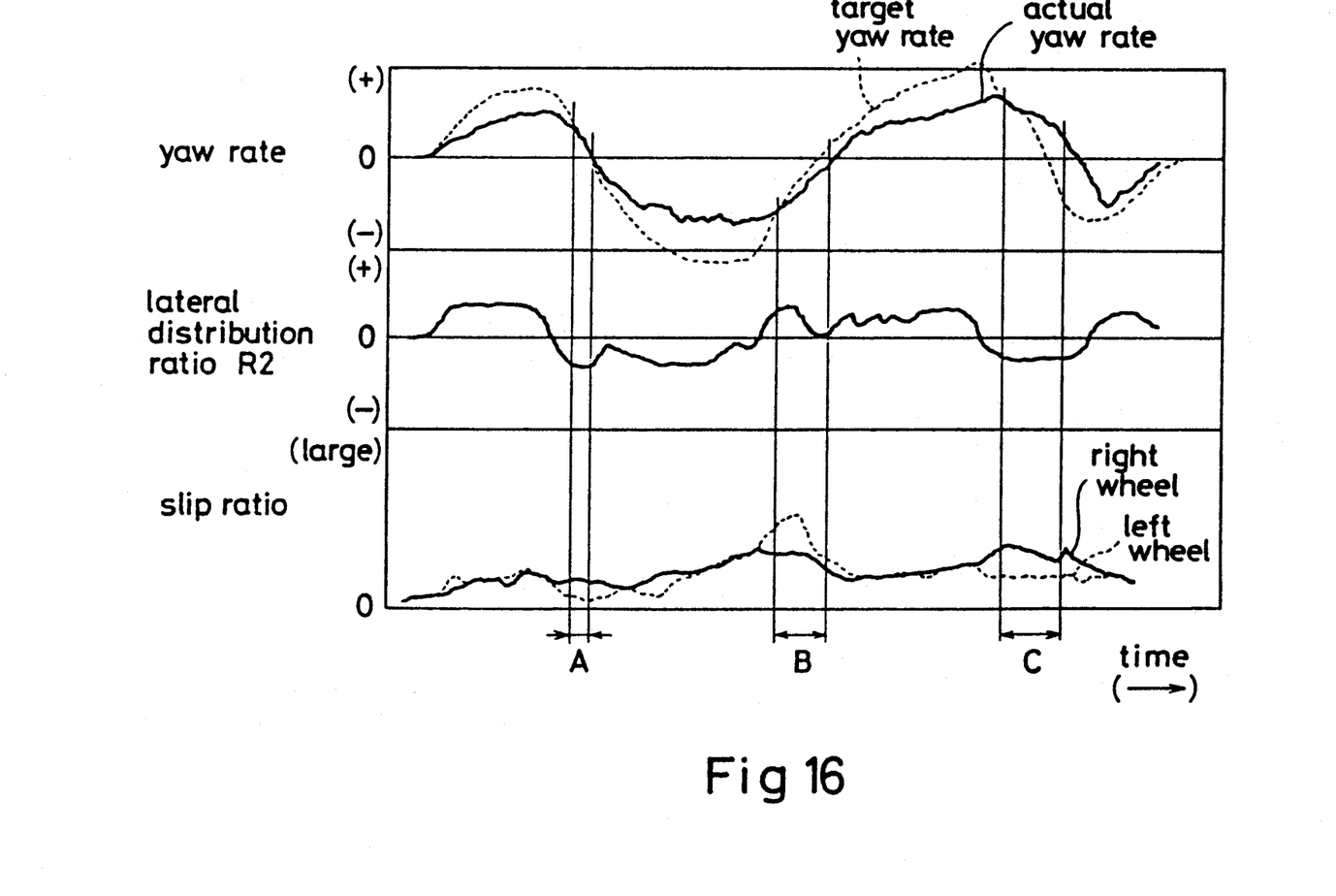
FIG. 16 is a characteristic chart showing a change with the passage of time of the yaw rate, lateral distribution ratio and slip rate.

As shown in FIG. 13, the actual yaw rate Yaw.r, which is accompanied by the steering, is high on the high μ road and low on the low μ road (the same may be said of the lateral acceleration). As shown in FIG. 14, when the meander running is executed on the low μ road, there is obtained the yaw rate Y.cal (corresponding to the high μ) shown in a dotted line. On the other hand, the actual yaw rate Yaw.r (shown in a solid line) almost corresponds to the target yaw rate Y.cal by the feed-back control of the lateral distribution ratio R2 (FIG. 16 shows the actual yaw rate Yaw.r obtained in the case where only the load movement correspondence control is executed without yaw-rate correcting the lateral distribution ratio R2. The yaw rate correction is more effective as compared with the results in FIG. 14).

Figure 15:
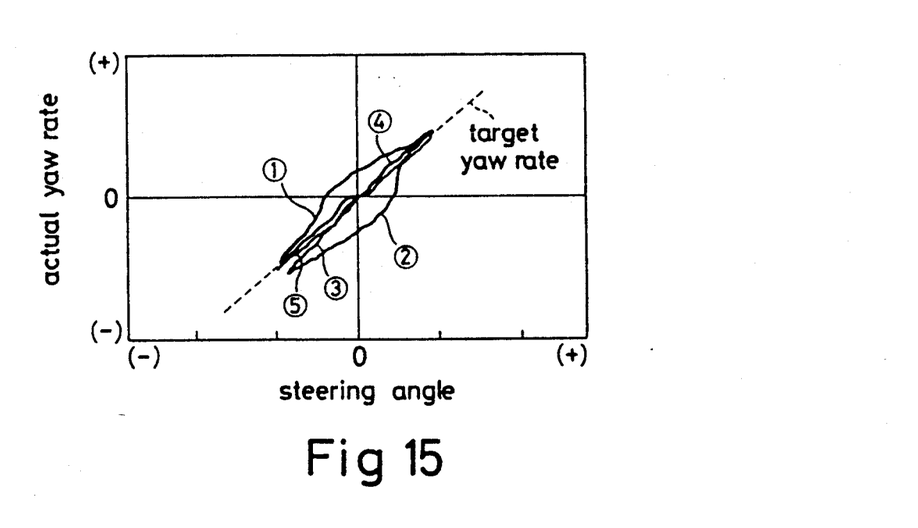
FIG. 15 is a characteristic chart showing the change of an actual yaw rate.

FIG. 15 shows the change of the actual yaw rate Yaw.r (in order of 1, 2, 3, 4 and 5) in the case where the car is caused to run so as to obtain the target yaw rate Y.cal (shown in a broken line). It is seen that the actual yaw rate Yaw.r gradually approximates to the target yaw rate Y.cal.

According to the control of the lateral distribution ratio R2, the yaw rate on the low μ road is the same as that on the high μ road shown in FIG. 14. Consequently, the quantity of drivers' steering can be prevented from being increased. As a result, the running stability and turning operation of the car can be enhanced.

If the target yaw rate Y.cal is increased and corrected at the time of turning start (Steps S32 and S33), the lateral distribution ratio is correspondingly increased. Accordingly, the grip force of the rear wheels 8 and 9 is not lowered during turning and at the time of turning escape. Consequently, the small turn of the car can be enhanced at the time of turning start.

If the lateral distribution ratio R2 is restricted correspondingly to the load movement rate W1at of the right and left wheels according to the lateral distribution ratio correction (Steps S36 to S39), the excessive lateral torque distribution can be prevented. Consequently, the slip rate of the turning outer wheels can be prevented from being increased. The lateral distribution ratio is restricted during turning and at the time of turning escape. Consequently, the small turn of the car is not damaged.

As shown in FIG. 16, in the case where the lateral distribution ratio R2 is not yaw-rate corrected, the occurrence of the actual yaw rate Yaw.r is delayed for the steering. Consequently, the actual yaw rate Yaw.r is made greater than the target yaw rate Y.cal (regions A, B and C in FIG. 16). Since the lateral distribution ratio R2 is yaw-rate corrected, the lateral torque distribution is executed in a manner reverse to the load movement rate in the regions A, B and C. As a result, the comparatively great slip is produced on the turning inner wheels in the regions A, B and C. On the other hand, the longitudinal distribution ratio R1 is corrected such that the torque distribution for the rear wheels 8 and 9 is decreased according to the longitudinal distribution ratio correction (Steps S40 and S41). Consequently, the slip of the turning inner wheels can be prevented.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A torque distribution control apparatus of a four wheel drive in which four wheels of a car are driven by engine outputs, comprising;
   torque distribution change means for adjusting a quantity of the engine outputs to be transmitted to the four wheels so as to change driving torque distribution between right and left wheels,
   a steering angle sensor for detecting a steering angle,
   a car speed sensor for detecting a car speed,
   a yaw rate sensor for detecting an actual yaw rate of the car, and
   torque distribution control means having a yaw rate setting section for setting a target yaw rate on the basis of the steering angle and car speed, and a lateral distribution ratio setting section for setting the torque distribution ratio between the right and left wheels such that the actual yaw rate corresponds to the target yaw rate and controlling the torque distribution change means on the basis of the distribution ratio thus set.

2. A torque distribution control apparatus of a four wheel drive according to claim 1, wherein the target yaw rate is caused on the car correspondingly to the steering angle and car speed when a friction coefficient is great between a road and tires.

3. A torque distribution control apparatus of a four wheel drive according to claim 2, wherein the torque distribution control means includes a running state decision section for deciding the turning start or turning escape of the car on the basis of the steering angle, and the yaw rate setting section sets the target yaw rate to be increased at the time of turning start and decreased at the time of turning escape.

4. A torque distribution control apparatus of a four drive wheel according to claim 3, wherein the torque distribution control means includes a lateral distribution ratio correction section which restricts and corrects the torque distribution ratio between the right and left wheels on the basis of the load movement rate between the right and left wheels.

5. A torque distribution control apparatus of a four drive wheel according to claim 4, wherein the torque distribution ratio between the right and left wheels are not restricted and corrected at the time of turning start of the car.

6. A torque distribution control apparatus of a four drive wheel according to claim 5, wherein the torque distribution control means includes a longitudinal distribution ratio setting section for setting the torque distribution ratio for the front and rear wheels correspondingly to the operating conditions of the car, and a longitudinal distribution ratio correction section for correcting the torque distribution ratio between the front and rear wheels such that the torque distribution for the rear wheels is decreased when the actual yaw rate exceeds the target yaw rate.

7. A torque distribution control apparatus of a four drive wheel according to claim 3, wherein the torque distribution ratio between the right and left wheels are not restricted and corrected at the time of turning start of the car.

8. A torque distribution control apparatus of a four drive wheel according to claim 7, wherein the torque distribution control means includes a longitudinal distribution ratio setting section for setting the torque distribution ratio for the front and rear wheels correspondingly to the operating conditions of the car, and a longitudinal distribution ratio correction section for correcting the torque distribution ratio between the front and rear wheels such that the torque distribution for the rear wheels is decreased when the actual yaw rate exceeds the target yaw rate.

9. A torque distribution control apparatus of a four wheel drive according to claim 1, wherein the torque distribution control means includes a running state decision section for deciding the turning start or turning escape of the car on the basis of the steering angle, and the yaw rate setting section sets the target yaw rate to be increased at the time of turning start and decreased at the time of turning escape.

10. A torque distribution control apparatus of a four drive wheel according to claim 9, wherein the torque distribution control means includes a lateral distribution ratio correction section which restricts and corrects the torque distribution ratio between the right and left wheels on the basis of the load movement rate between the right and left wheels.

11. A torque distribution control apparatus of a four drive wheel according to claim 10, wherein the torque distribution ratio between the right and left wheels are not restricted and corrected at the time of turning start of the car.

12. A torque distribution control apparatus of a four drive wheel according to claim 11, wherein the torque distribution control means includes a longitudinal distribution ratio setting section for setting the torque distribution ratio for the front and rear wheels correspondingly to the operating conditions of the car, and a longitudinal distribution ratio correction section for correcting the torque distribution ratio between the front and rear wheels such that the torque distribution for the rear wheels is decreased when the actual yaw rate exceeds the target yaw rate.

13. A torque distribution control apparatus of a four drive wheel according to claim 1, wherein the torque distribution control means includes a lateral distribution ratio correction section which restricts and corrects the torque distribution ratio between the right and left wheels on the basis of the load movement rate between the right and left wheels.

14. A torque distribution control apparatus of a four drive wheel according to claim 1, wherein the torque distribution control means includes a longitudinal distribution ratio setting section for setting the torque distribution ratio for the front and rear wheels correspondingly to the operating conditions of the car, and a longitudinal distribution ratio correction section for correcting the torque distribution ratio between the front and rear wheels such that the torque distribution for the rear wheels is decreased when the actual yaw rate exceeds the target yaw rate.

15. A torque distribution control apparatus of a four wheel drive according to claim 1, wherein each wheel of the car is braked by a respective brake and said torque distribution change means adjusts each respective brake so as to change driving torque distribution between the right and left wheels.

16. A torque distribution control apparatus comprising;
- torque distribution change means for adjusting a quantity of the engine outputs to be transmitted to right and left wheels so as to change driving torque distribution between said wheels,
- a steering angle sensor for detecting a steering angle,
- a car speed sensor for detecting a car speed,
- a yaw rate sensor for detecting an actual yaw rate of the car, and
- torque distribution control means having a yaw rate setting section for setting a target yaw rate on the basis of the steering angle and car speed, and a lateral distribution ratio setting section for setting the torque distribution ratio between the right and left wheels such that the actual yaw rate corresponds to the target yaw rate and controlling the torque distribution change means on the basis of the distribution ratio thus set.

17. A torque distribution control apparatus of a four wheel drive in which each wheel of a car is braked by a respective brake comprising;
- torque distribution change means for adjusting each respective brake so as to change driving torque distribution between right and left wheels,
- a steering angle sensor for detecting a steering angle,
- a car speed sensor for detecting a car speed,
- a yaw rate sensor for detecting an actual yaw rate of the car, and
- torque distribution control means having a yaw rate setting section for setting a target yaw rate on the basis of the steering angle and car speed, and a lateral distribution ratio setting section for setting the torque distribution ratio between the right and left wheels such that the actual yaw rate corresponds to the target yaw rate and controlling the torque distribution change means on the basis of the distribution ratio thus set.

* * * * *